L. W. HARBAUGH.
Horse-Collar.
No. 160,318. Patented March 2, 1875.
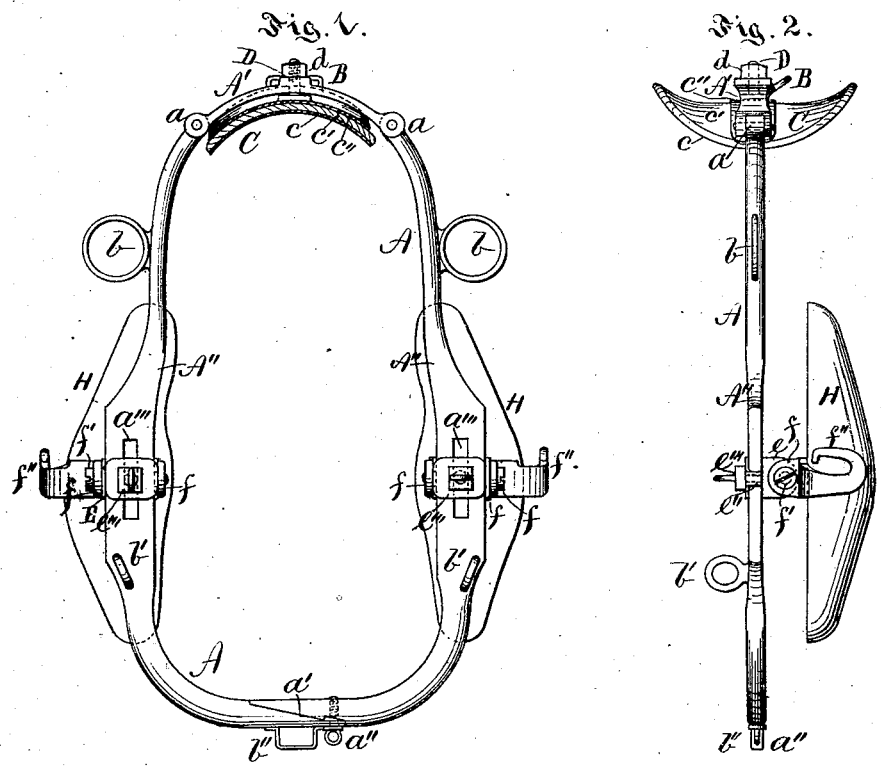
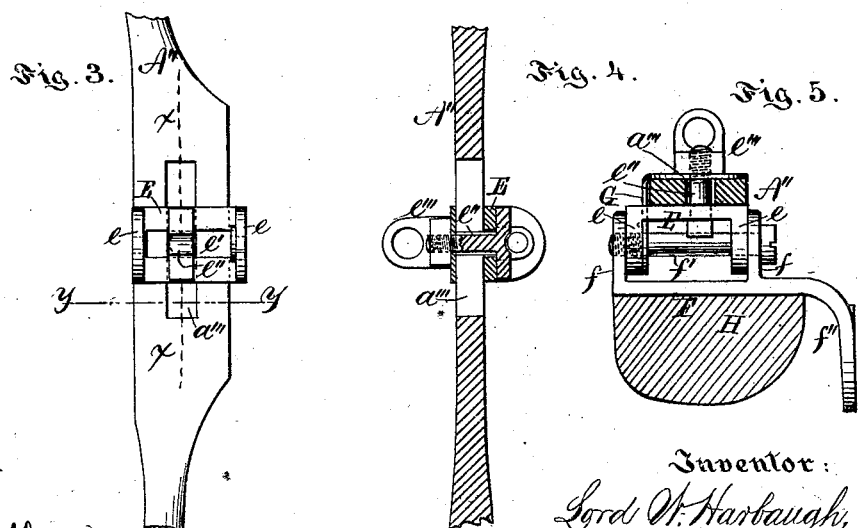
Witnesses:
A. McCallum
D. G. Stuart
Inventor:
Lord W. Harbaugh,
By W. B. Richards,
Atty.

UNITED STATES PATENT OFFICE.

LORD W. HARBAUGH, OF MUSCATINE, IOWA.

IMPROVEMENT IN HORSE-COLLARS.

Specification forming part of Letters Patent No. 160,318, dated March 2, 1875; application filed January 7, 1875.

*To all whom it may concern:*

Be it known that I, LORD W. HARBAUGH, of Muscatine, county of Muscatine and State of Iowa, have invented certain new and useful Improvements in Harness Draft-Plates, of which the following is a specification:

This invention relates to improvements in metallic collars or harness draft-plates; and the invention consists, first, in making the collar rigid; second, in the employment of short bearing pads or plates hinged to the rear side of the metallic collar, so as to have an oscillating movement in a vertical plane, and attached to the collar so as to be adjustable both vertically and laterally thereon, to adapt it to different-sized animals, and to cause it to rest when in use in the cavity of the shoulder formed by the concave forward part of the scapula or shoulder-blade of the animal; third, in the construction of the neck-pad; and, fourth, in pivoting the neck-pad to the collar, all as hereinafter fully described.

To enable others skilled in the art to make and use my invention, I will now proceed to describe the same with reference to the accompanying drawing, in which—

Figure 1 is a front elevation of my invention. Fig. 2 is a side elevation. Fig. 3 is a detail view, a rear elevation of a section of the collar with the draft-pad and hook removed. Fig. 4 is a detail sectional view in the line $x\ x$ of Fig. 3, and Fig. 5 is a sectional view in the line $y\ y$ of Fig. 3.

Referring to the parts by letters, A represents the collar, consisting of an upper central part, A', and side bars A'' A''. The side bars A'' are hinged at $a\ a$ to the part A', so as to allow them to be turned outward to open the collar, but held rigidly by said joints when their lower ends are brought together and secured by a scarf-joint, $a'$, and thumb-screw $a''$, or by any suitable joint. To the collar A may be attached by any suitable means, as staple B, for the turn-back strap, rings $b\ b$ for the lines, rings $b'\ b'$ for the breast-strap, and staple $b''$ for the collar martingale-strap. C is the neck-pad, the lower plate $c$ of which is made of any suitable metal, and of the ordinary form, and the upper side made of leather $c'$. $c''$ is a curved plate fitting and riveted to and across the pad C to strengthen it. D is a stud projecting upwardly from the central part of the plate $c''$ through an aperture in the bar A', and provided on its upper end with a nut, $d$. The stud D fits loosely in the bar A' and forms a swivel, on which the pad may be oscillated horizontally on the collar. E is a plate having side arms $e\ e$, and its central part slotted, as shown at $e'$, Fig. 3. The plates E are secured to the bars A'' by means of a bolt, $e''$, which passes through the slot $e'$, and through a slot, $a'''$, in the bar A'', and carries a nut, $e'''$, on its end. F is a plate having arms $f\ f$, corresponding with the arms $e\ e$, to which they are hinged by a bolt, $f'$. One end of the plate F is extended outward and rearwardly, and formed into a hook, $f''$, for the attachment of the trace. G is a stay for the plate E, one end of which has an eye receiving the bolt $f$, and passing back through the plate E. The other end has an eye, through which the screw-bolt $e''$ passes, as shown at Fig. 5. H H are the bearing-pads, constructed of wood, or any other suitable material, one of their sides attached to the plates F, and their other side formed as shown in the drawings, or to conform to the usual cavity in the animal's shoulder. The pads H are short, and fit as nearly as may be the cavity in the animal's shoulder, hereinbefore described, and as they oscillate on the bolts $f'$ they conform to the varying angles of the shoulder produced by the movements of the animal, and bring the pressure to bear upon the shoulders always in the most favorable manner. The pads H H may be adjusted to and from each other, or laterally, to adapt them to varying-sized animals, by adjusting the slotted plates E on the bolts $e''$, and vertical adjustment may be effected by the bolt $e''$ in the slot $a'''$, in the obvious manner, to secure the proper vertical position on the animal's shoulder. The rigidity of the collar A will prevent the bearing-pads H from turning into positions to injure the animal's shoulder. The pivoted neck-pad has freedom to adapt itself to all turns of the neck of the animal, and turnings of the collar A.

Having thus described my invention, what I claim as new, and desire to secure by Letters Patent, is—

1. The rigid collar A, in combination with the bearing-pads H, the latter being formed to fit the shoulder, and pivoted to the collar so as to oscillate freely and conform to the movements of the animal, substantially as set forth.

2. The bearing-pads H, attached to the collar A by laterally-adjustable plates E, substantially as and for the purpose specified.

3. The bearing-pads H, attached to the collar A by vertically-adjustable plates E, substantially as described, and for the purpose specified.

4. The combination of the collar A, oscillating pad C, vertically and laterally adjustable and oscillating pad H, and draft-hooks $f$, substantially as described, and for the purpose specified.

LORD W. HARBAUGH.

Witnesses:
 THOMAS McKEE,
 W. B. RICHARDS.